July 15, 1952 W. L. WORTHEN 2,603,329

AUTOMATIC SELECTOR MECHANISM

Filed Sept. 23, 1946 5 Sheets-Sheet 1

Inventor

WILLIAM L. WORTHEN

By Hyman Hurvitz his Attorney

July 15, 1952 W. L. WORTHEN 2,603,329

AUTOMATIC SELECTOR MECHANISM

Filed Sept. 23, 1946 5 Sheets-Sheet 2

Inventor

WILLIAM L. WORTHEN

By Hyman Hurvitz his Attorney

July 15, 1952 W. L. WORTHEN 2,603,329

AUTOMATIC SELECTOR MECHANISM

Filed Sept. 23, 1946 5 Sheets-Sheet 3

Inventor

WILLIAM L. WORTHEN

By Hyman Hurvitz his Attorney

July 15, 1952 W. L. WORTHEN 2,603,329

AUTOMATIC SELECTOR MECHANISM

Filed Sept. 23, 1946 5 Sheets-Sheet 4

Inventor

WILLIAM L. WORTHEN

By Hyman Hurvitz his Attorney

July 15, 1952 W. L. WORTHEN 2,603,329

AUTOMATIC SELECTOR MECHANISM

Filed Sept. 23, 1946 5 Sheets-Sheet 5

Inventor

WILLIAM L. WORTHEN

By Hyman Hurvitz his Attorney

Patented July 15, 1952

2,603,329

UNITED STATES PATENT OFFICE 2,603,329

AUTOMATIC SELECTOR MECHANISM

William L. Worthen, Washington, D. C., assignor to Melpar, Inc., Washington, D. C., a corporation of New York Application September 23, 1946, Serial No. 698,607

7 Claims. (Cl. 192—142)

This invention relates generally to control devices and more particularly to devices for controlling the positions of one or more shafts from a remote point.

It is an object of the invention to provide a shaft positioning system of simplified character, which shall lend itself to fabrication in extremely compact form.

It is a further object of the invention to provide a shaft positioning system which shall be capable of positioning a plurality of shafts under the control of a selecting operation, each of the shafts being independently actuated to one of a plurality of preselected positions, in response to each of the selecting operations.

It is still a further object of the invention to provide a shaft positioning system of extreme accuracy, and which shall be adapted for controlling tuning devices and control devices associated with radio transmitters and the like, to enable operation thereof at any one of a plurality of predetermined frequencies, in accordance with a selection operation performed remotely from the said transmitter.

Still a further object of the invention resides in the provision of a remote tuning and control system of novel construction for radio equipment in general, and for radio transmitters in particular.

It is another object of the invention to provide a system of the above character which is particularly adapted for compactness and lightness of construction not only without sacrifice of accuracy and reliability of results but with a marked increase in these desirable qualities.

Still further objects and advantages of the invention will become apparent upon study of the following detailed description of a particular embodiment thereof, when taken in conjunction with the accompanying drawings, wherein.

Figures 3A, 3B:
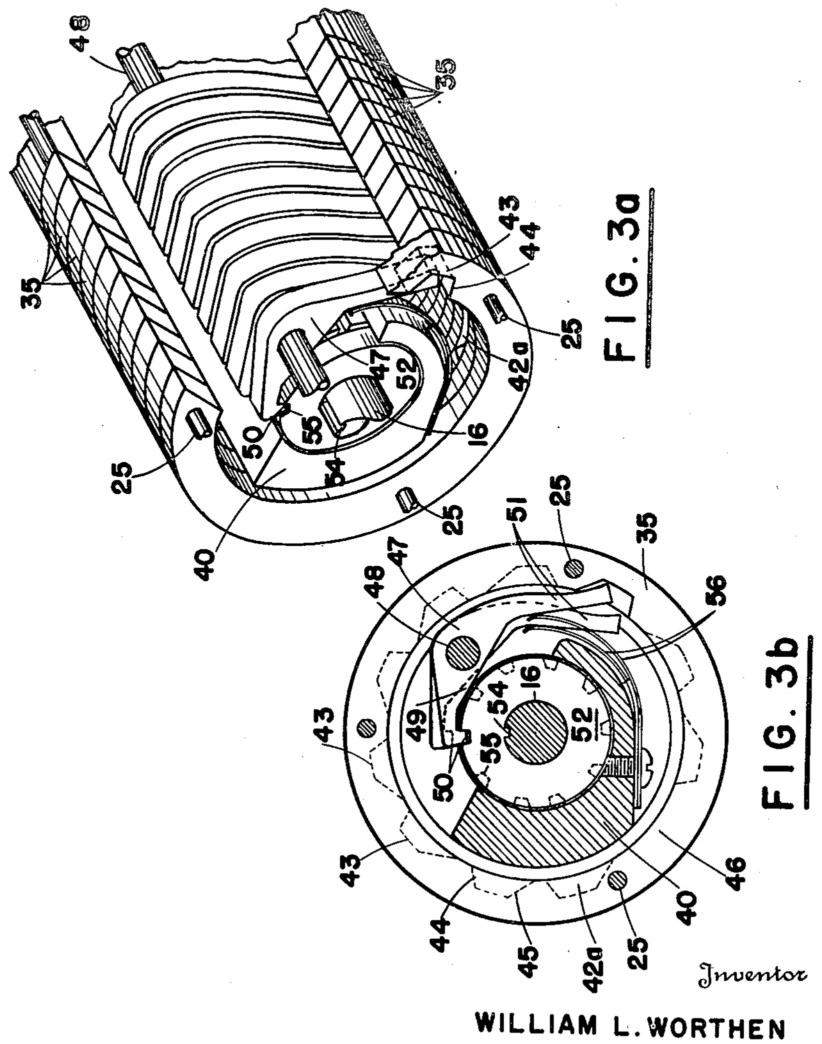

Figure 3*a* is a perspective view showing, in assembly, a plurality of shaft position stop rings, locking devices associated with the rings, and selector cams for the locking devices.

Figure 3*b* is a view taken in transverse section through the assembly of Figure 3*a*.

Figure 4:
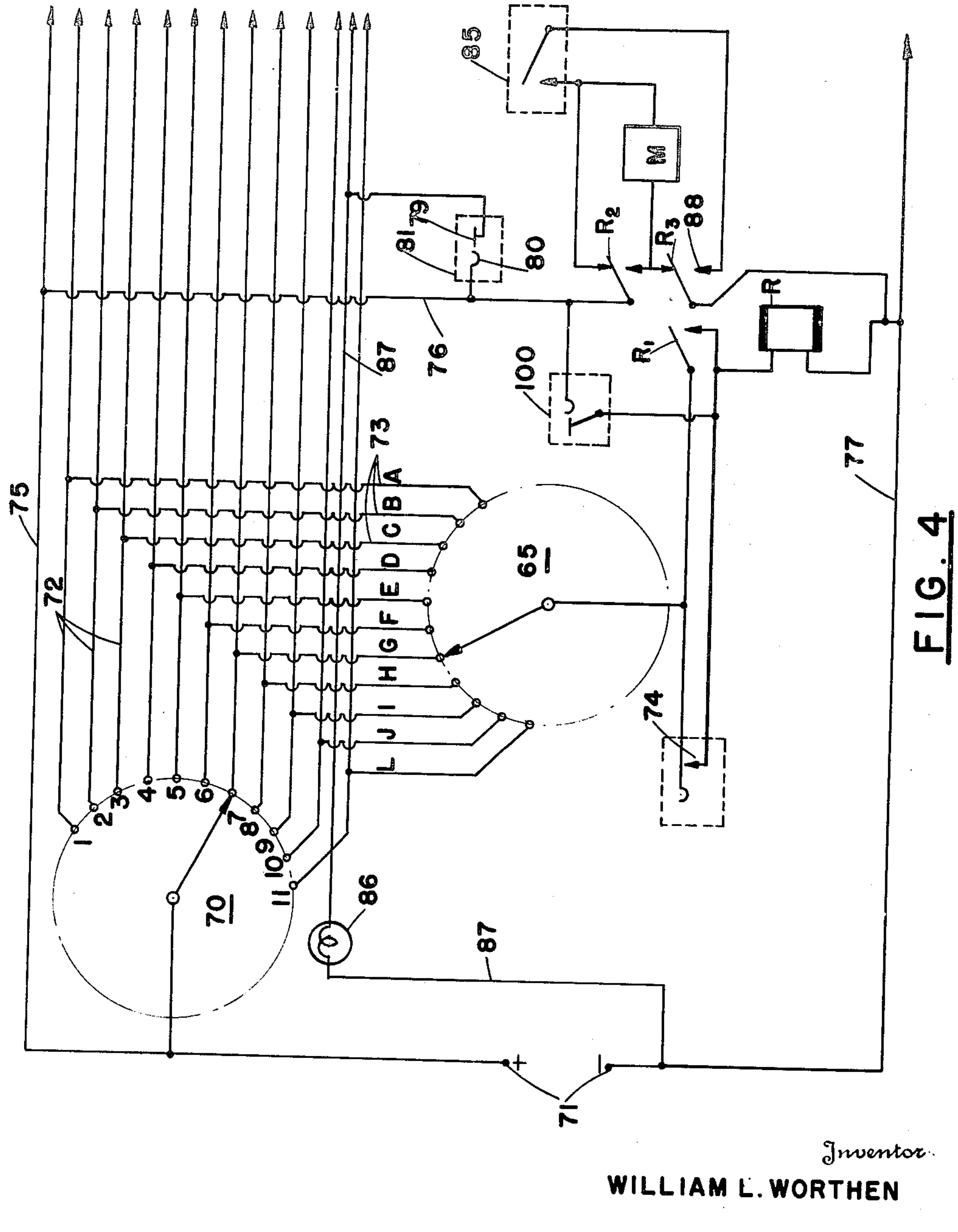

Figure 4 is a wiring diagram of the illustrated embodiment of the invention.

Figure 5:
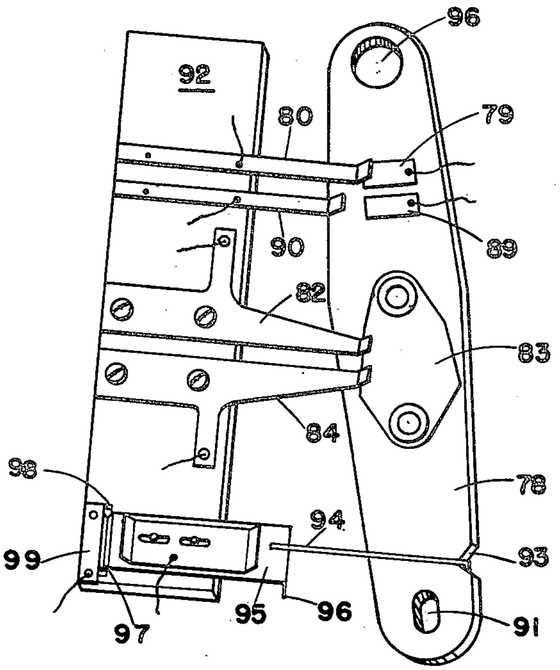
Figure 6:
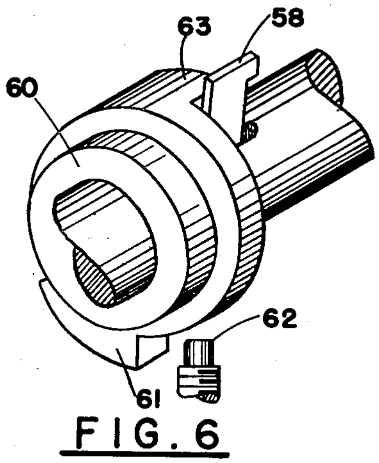

Figure 5 is a view in perspective of a control and protective switching arrangement illustrated in schematic fashion in the wiring diagram of Figure 4; and Figure 6 is a perspective view of a zero stop device of novel construction and which forms part of the mechanism of the invention.

Briefly described, the present invention is adapted to position each of a plurality of shafts to preselected positions in response to control action of a selector switch. The system is so arranged that the position of each of the plurality of shafts, in response to selection of any switch position, is independent of the positions of the remaining shafts. Each shaft may be positioned selectively to any one of a plurality of positions, and the positions may be preselected or predetermined readily and by an extremely simple operation, and modified whenever and as desired.

In the present embodiment of the invention provision is made for a total of ten predetermined shaft positions, in response to the selection of ten control switch positions. Additionally, means are provided in response to still a further control switch position, to arrange the system for manual control of shaft position, independent of the normal action of the position control mechanism. It is to be understood, however, that the system lends itself readily to providing more or less than ten shaft positions, as desired, for any one shaft, and that any desired number of shafts may be simultaneously controlled.

Systems capable of accomplishing the above described functions have been constructed and operated heretofore. The present invention relates to improvement in such systems, whereby they may be rendered more compact, more efficient, more accurate, simpler and generally more effective. To this end resort has been had to a concentric type of construction, involving a rotatable outer selector cam drum assembly which is motor driven and performs a pawl selection function and being controlled to assume various positions in accordance with the settings of a multi-position control switch.

A pawl assembly, comprising a plurality of spring pressed pawls for coacting with the selector cam drum assembly, is mounted internally of the drum assembly, the construction and arrangement of the pawl assembly being such that the pawls remain stationary and are selected for a locking operation in accordance with the final position assumed by the selector cam drum assembly in accordance with the adjustment of the control switch. Internally of both the drum and the pawl assemblies is located a main shaft assembly, comprising a shaft which may be selectively positioned in response to the functioning of the mechanism, and a plurality of lock discs which are free to rotate about the shaft independently of one another, for purposes of preselection or predetermination of shaft positions, and which may be clamped fast to the shaft thereafter. Each of the lock discs is provided with a notch adapted to be secured by one of the pawls to which reference has heretofore been made. After a pawl has been selected by the selector cam drum assembly, in the course of a cycle of operation of the mechanism, the main shaft assembly is rotated relative to the pawl assembly by means of a friction clutch, until the notch in that lock disc which cooperates with the selected pawl is opposite the head of the selected pawl, whereupon the disc is locked by the pawl against further motion, the shaft being then positioned. The shaft may be coupled mechanically to mechanisms of any desired character which it is required to position. A preferred application of the present invention, however, relates to the tuning of radio transmitters, the positionable shafts being then coupled mechanically to the shafts of the tuning elements commonly utilized for selecting communications channels for radio transmitters.

Figure 1:
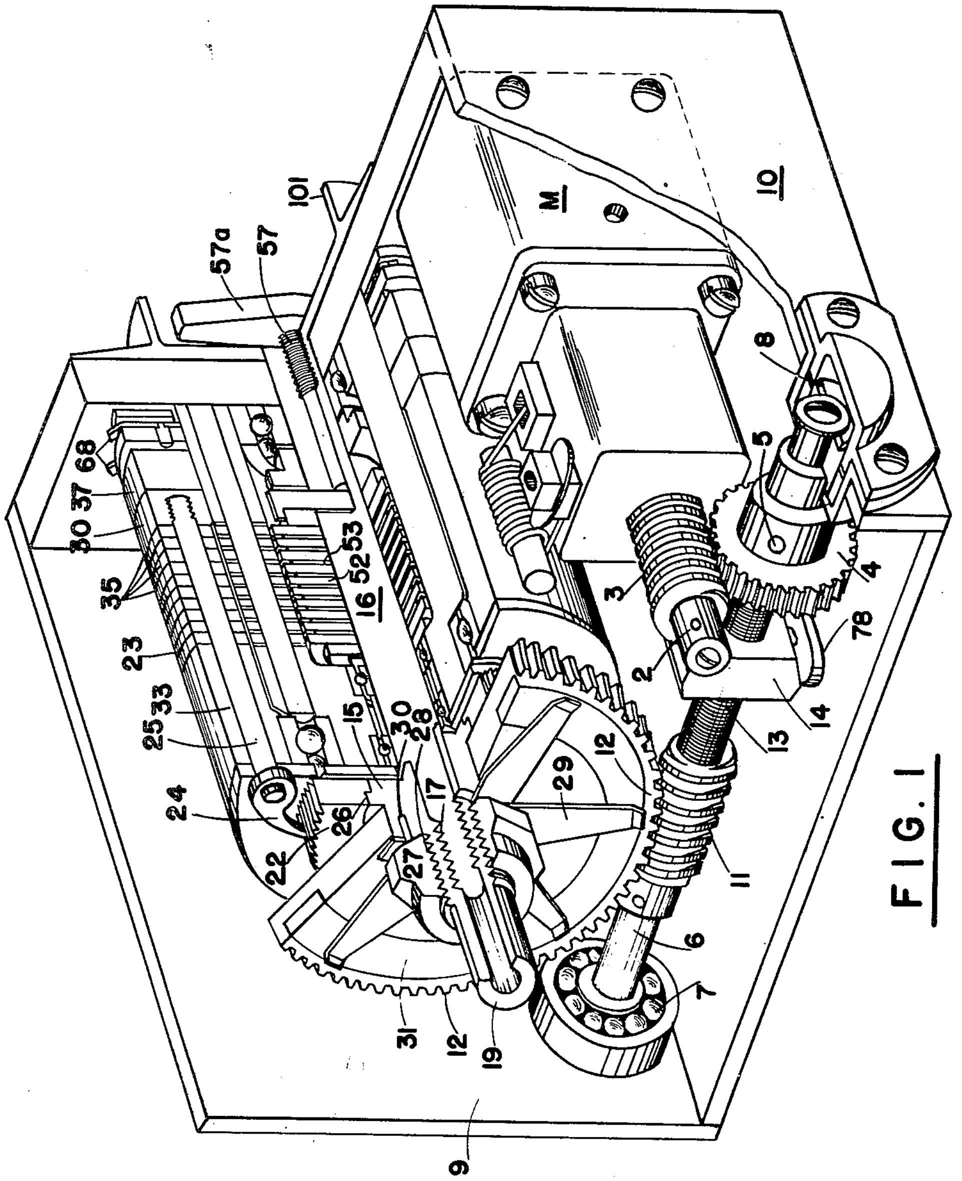
Figure 1 is a perspective view of a complete shaft positioning device constructed in accordance with the invention, and with certain parts cut away or removed to clarify the overall construction.

Referring now to the drawings, and particularly to Figure 1 thereof, the reference M denotes a reversible drive motor, the specific character of which is of no particular moment but which is selected to be of a minimum dimension. Secured to the shaft 2 of the motor M is a worm gear 3 which meshes with and serves to drive a gear 4 secured by a pin or set screw 5 to a jack shaft 6 which extends at right angles to the motor shaft 2. The jack shaft 6 extends between a pair of bearings 7, 8 secured to or mounted on opposite walls 9, 10 of a housing which serves to contain the mechanisms involved in the system of the invention. While the specific character of the bearings 7 and 8 forms no part of the present invention, the bearing 8 is preferably so constructed as to prevent axial motion of the shaft 6, in known manner.

Secured to the shaft 6 by means of a set screw, or in any equivalent manner, is a worm gear 11 which serves to transmit motion to the shaft positioning mechanism proper by way of a driven gear 12. Machined on the shaft 6 is a screw thread 13, which performs the function of translating a traveling nut 14, the latter in turn actuating a switching device, which is illustrated in detail in Figure 5 of the drawings, and the function of which will be explained in detail in connection with the circuit diagram of Figure 4.

As will appear when the circuit diagram of Figure 4 is explained in detail, selection of shaft positions is controlled by a manual selector switch having a plurality of contacts, each of the contacts corresponding with a shaft position, which may be predetermined. Upon actuation of the selector switch to initiate a shaft positioning operation the motor M is energized and caused to rotate in a direction such as to cause clockwise rotation of the gear 12, as viewed in Figure 1. The gear 12 is mounted for rotation on an annular member or hub 15 which may be integral with the main shaft extension 19, and which is internally threaded to accommodate external threads 17 formed on the end of the main shaft 16. A tapered pin 18, moreover, extends radially through aligned apertures provided therefor in the annular member or hub 15 and in the shaft 16 to provide a positive coupling therebetween at all times. The end of the annular member or hub 15 which constitutes the shaft extension 19 extends beyond the end plate 20 of the housing, there constituting the positionable shaft of the invention. To the shaft extension 19 may be mechanically coupled devices of various character which it is desired to position.

Secured to the forward face of the gear 12 as by means of one or more screws 21 (see Figure 2) is a ratchet wheel 22, which serves as a one way clutch for transmitting motion between the gear 12 and a selector cam drum assembly 23, by means of a spring-pressed pawl 24 which is pivotally mounted on a pin 25 extending from the cylinder 23. In one direction of rotation of the gear 12, specifically clockwise as seen in Figure 1, some one of the teeth formed in the periphery of the ratchet wheel 22 engages the pawl 24 to drive the drum assembly 23. In the opposite direction of rotation of the gear 12, on the other hand, and specifically counter-clockwise as viewed in Figure 1, the pawl 24 rides over the teeth of the ratchet wheel 22, and provides no mechanical coupling.

The ratchet wheel 22 is provided with an annular recess 26 along the face thereof which rests against the gear 12, the annular groove formed by the face of the gear 12 and the recess 26 riding on an annular shoulder on the hub 15, this construction serving to prevent lateral play of the gear 12 and of the ratchet 22 with respect to the hub 15.

A lock nut 27 is provided, further, for threadedly engaging a threaded portion 28 of the shaft extension 19 and which serves to retain a spider 29 firmly gripped against the member 15 and immovable with respect thereto. To assure attainment of this objective a pin 30 may be further provided, passing through one arm of the spider 29 and into the member 15.

The spider 29, as is made evident by reference to Figure 1, comprises a plurality of arms which are fabricated of spring material and which press at the outer ends thereof against an annular insert 31 in a face of the gear 12, the insert 31 being fabricated of friction material and constituting a clutch disc. The arms of the spider 29 taken in conjunction with the annular fibre insert or clutch disc 31 provide a friction or slipping bi-directional clutch for transmitting motion between the gear 12 and the shaft 16.

Figure 2:
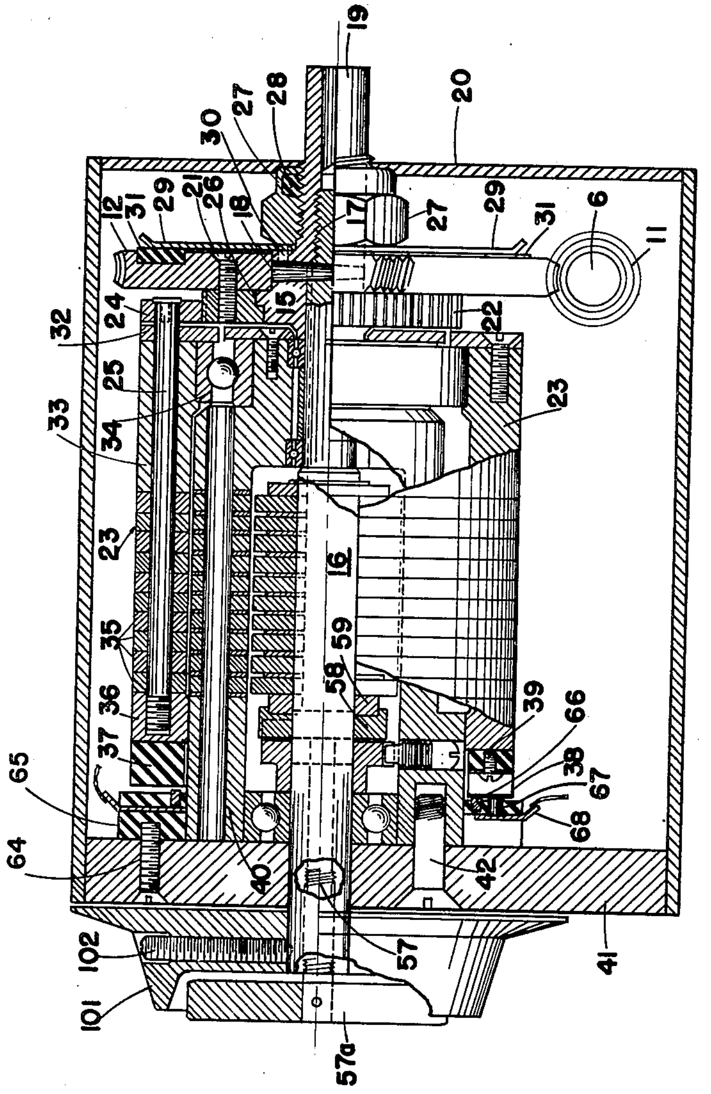
Figure 2 is a sectional view taken axially through a shaft selecting cylinder, and showing details of construction of shaft position selecting cams, and of associated stop rings and control pawls therefor.

The selector cam drum assembly 23, which was heretofore referred to as being driven from the gear 12 by means of a uni-directional clutch comprising a ratchet wheel 22 and a pawl 24, is constructed of a plurality of co-axial cylinders and rings, of equal diameter, held together by a plurality of bolts 25 extending therethrough in a direction parallel to the axis of the shaft 16. Referring specifically to Figures 1 and 2 of the drawings it will be seen that the drum assembly 23 comprises a rear cover plate 32 secured to a face of a hollow cylinder 33 which is rotatable on a ball bearing 34. Stacked to the cylinder 33 is a plurality of thin annular seelctor rings 35, the number of such rings being ten in the exemplified embodiment of the invention, but which may be more or less than ten, as required to suit the exigencies of particular situations. Beyond the selector rings 35 is a further hollow cylinder 36 fabricated of metal, as are the rings 35 and the cylinder 34, and to the cylinder 36 is secured a further annular member 37 fabricated of electrical insulating material, and to which, at one point thereof, is secured a spring conducting member 38, as by means of a screw 39. The cylinder 36 serves as a forward bearing for the cylindrical structure 23, the inner periphery of the ring 36 bearing rotatably on a portion of the outer periphery of a generally cylindrical structure 40, which is secured to the forward wall 41 of the housing, as by means of screws 42.

Referring now to Figures 3*a* and 3*b*, wherein the structure of the selector rings 35 is clearly illustrated, it will be evident that each of the discs 35 is provided internally with a recess 42*a*, and having a surface 43 parallel with and set in from the inner periphery of the disc. Connecting the surface 43 with the inner periphery of each disc 35 is one surface 44 which departs but slightly from the radial and another surface 45 which diverges sharply, and which, as will appear hereinafter, functions as a cam. The rings 35 will be referred to hereinafter as "selector rings," as descriptive of the function of the rings 35.

The recess 42*a* of each of the rings 35 is arranged to occupy less than 1/11 of the total internal periphery of the disc, and the discs when assembled are displaced with respect to one another by a distance equal to 1/11 of the length of the inner periphery, a helical displacement of successive recesses 42*a* being preferred. Since each recess occupies less than 1/11 of the inner periphery and since there are in all ten discs, it will be clear that after the discs have been assembled there will remain a portion of the interior wall of the assembled drum which corresponds in dimension to slightly more than 1/11 of the inner periphery which is devoid of recesses, as is evident in Figure 3*b* at 46.

While I have illustrated and described a structure in which the recesses 42*a* are displaced one from another, in helical fashion, and wherein individually fabricated rings 35 are assembled to form a drum assembly, I contemplate also a slightly different construction (not shown) wherein a selector cam drum assembly of unitary construction may be employed, the recesses 42*a* being then milled in the interior walls thereof or even cut completely through the walls. In such case a different arrangement of the recesses 42*a* may be resorted to, specifically after a checkerboard fashion, successive recesses being displaced by 2, 3, 4 or more elevenths of the inner periphery of the drum. Such an arrangement of the recesses does not affect the general operation of the device, nor the spirit and intent of the invention and may be utilized in the discrete cam ring construction of the selector drum assembly, which is illustrated in the drawings, equally as well as in the unitary construction of the selector cam drum.

The stationary and generally hollow cylindrical frame 40, referred to supra, is cut away for a portion of the wall thereof to accommodate a pawl assembly consisting of a plurality of pivoted pawls 47, which are mounted for limited pivotal movement on a shaft 48 extending across the cut-away parallel to the axis of the cylinder 40 and supported by the walls of the cylinder 40 in fixed relation thereto. The shape of the pawls 47 is clearly shown in Figure 3*b* of the drawings, each comprising a head or locking portion 49 having at one extremity thereof a generally radially extending locking lug 50, slightly tapered, and a further tail or camming portion 51 adapted to engage a recess 42*a* of a selector ring 35, or to slidingly engage the inner periphery of the said ring. A pawl 47 is provided in association with each of the discs 35, two such pawls being illustrated in Figure 3*b*, one of which is shown fully engaged within a recess 42*a* and one of which is shown riding on the normal inner periphery of ring 35. Since the pawls 47 are all similar in shape, and since the recesses 42*a* in each of the discs 35 are displaced with respect to one another it is clear that in no circumstances can more than a single pawl 47 be engaged with a recess 42*a* at any one time.

Rotatably mounted on the main shaft is a plurality of shaft positioning discs 52, one of the discs 52 being associated with each of the pawls 47. The discs 52 are separated by thin spacer discs or washers 53, the latter being of smaller diameter than the discs 52, to avoid interference with the locking lugs 50, and being each provided with a key for interlocking with a keyway 54 machined in the shaft 16. Thereby the shaft 16 and the spacer discs 53 are rendered incapable of relative rotation, but are capable of slight relative axial motion. The discs 52, on the other hand, may be quite free to rotate on the shaft 16 when released by a locking mechanism, described hereinafter. Each of the discs 52 is provided with a notch 55 in its outer periphery, which is dimensioned precisely to receive the locking lug 50 of the co-acting pawl 47. Each of the discs 52, as will appear hereinafter, may be positioned with its notch 55 spaced selectively relatively to a zero position of shaft 19, the position of the notch then corresponding with a desired and predetermined position to which shaft 19 may be selectively and automatically positioned in the course of the operation of the system.

When the tails 51 of the pawls 47 ride on the inner surfaces of the selector rings 35 the lugs 50 ride free of the discs 52. Rotation of the selector ring drum assembly 23 causes successive ones of the tails 51 to fall within associated recesses 42*a* to the slight extent permitted by the lug 50, which rides then on the outer periphery of its associated positioning disc 52. Rotation of the shaft 16 and of the discs 52 locked thereto until a slot 55 coincides with a lug 50 of that pawl 47, the tail of which has been presented to a recess 42*a*, results finally in the lug 50 falling into and engaging the notch 55, thereby locking the ring 52, as well as the shaft 16.

Each of the pawls 47 is individually spring pressed, by means of springs 56 of a multiple cantilever spring assembly secured to the structure 40, and serving to press the tails 51 of the pawls 47 against the inner periphery of the discs 35 and to press the lugs 50 into engagement with the stop discs 52.

The lock discs 52 may be loosened on the shaft 16 to enable positioning of any one or of several thereof in accordance with predetermined desired positions of shaft 19, by loosening the screw 57, which extends internally of the shaft 16 and which may be turned by means of a thumb nut 57*a*. An end of screw 57 engages with a key 58, which extends completely through a diametral slot in the shaft 16, and which is capable of axial movement in the slot. The key 58 is provided with ears extending over a ring 59 which may be pressed against the first of rings 52 when the screw 57 is tightened against the key 58, thereby locking the rings 52 firmly on the shaft 16.

A limit stop mechanism is provided for limiting the possible motion of the shaft 16 in the course of a tuning operation, this stop permitting at least a full 360° rotation of the shaft, and providing a definite zero position for the shaft 16 to which the said shaft is always returned in the course of a shaft positioning cycle, and from which the shaft is positioned to its preselected position. Referring now to Figures 2 and 6 of the drawings, it will be seen that the limit stop mechanism comprises a disc 60 mounted for free rotation on the shaft 16 but comprising a projection 61 which may engage with a stop screw 62 extending from an aperture in the cylindrical assembly 40. The stop disc 60 further comprises a projection 63, which extends parallel to the shaft 16 and into the path of the key 58. The shaft 16 in one direction of rotation causes the key 58 to impinge upon one face of the projection 63 and carries the disc 60 about the shaft 16 until the one face of the projection 61 impinges against the stop screw 62. In the opposite direction of rotation of the shaft 16 the opposite face of the projection 63 is engaged by the key 58 and forces the stop disc 60 about the shaft 16 until the opposite face of projection 61 impinges against the stop screw 62. By proper dimensioning of the projections 61 and 63, of the screw 62 and of the key 58 it is readily possible to provide free rotation of the shaft 16 for 360° or more, while providing a positive zero stop.

Supported on the forward wall 41 of the housing by means of screws 64 is a circuit switch assembly 65, the screws 64 extending, if desired, through slots in the wall 41 to enable adjustment of the position of assembly with respect to the zero position of the shaft 16, thereby assuring proper alignment of the switch assembly 65 with respect to the selector drum assembly, the tuning pawl assembly and the main shaft or lock disc assembly.

The circuit switch assembly 65 comprises a ring fabricated of insulating material and containing a co-axial conducting ring 66 secured thereto as well as a plurality of contacts 67 spaced about the insulating ring at intervals of 1/11 of the circumference, or at positions spaced in correspondence with the positions of the recesses 42*a*. Radial slots are provided in the insulating ring to enable insertion of conducting lugs 68, which are soldered each to a contact 67 and to which may be soldered or otherwise connected wire leads. To the annular member 37, as has been explained heretofore, at one point thereof is secured the spring contact 38 which provides electrical connection between the conducting ring 66 and a selected one of the contacts 67, the position of the selector cam assembly 23 determining which one of the contacts 67 shall be in contact with the ring 66.

*Circuit diagram*

Referring now to Figures 4 and 5 of the drawings, there is illustrated a wiring diagram of the embodiment of the invention forming the subject matter of this specification.

The reference numeral 70 represents a selector switch, which may be positioned remotely from the shaft positioning mechanism proper, and which in the presently described embodiment of the invention comprises 11 positions, ten of which correspond with ten shaft positions and the 11th of which enables manual positioning of the shaft. It will be realized that more or less than 10 shaft positions may be provided for, if desired, without departing from the spirit of and true scope of the invention. The selector arm of the switch 70 is connected with one terminal of a source of electrical power 71, shown as positive, and serves to transfer potential from that terminal to the selected one of the contacts. A plurality of conductors 72 extend from the respective contacts of the switch 70 to a plurality of shaft positioning units (not shown), and the position of the selector arm of the switch accordingly may serve to control a plurality of shaft positions, no limit existing as to the total number of shafts which may be positioned in the present system. The conductors 73 serve to interconnect the contacts of switch 70 with corresponding contacts of the switch assembly 65, and which is illustrated in Figure 5 in conventionalized fashion, the actual structure of the switch assembly 65 having been described hereinbefore.

A relay R is energized when the switches 65 and 70 are in correspondence, the circuit extending from terminal 71, over switches 70 and 65 in series via one of leads 72 and via the contacts $R_1$, through the coil of relay R and back to the source of power 71 via lead 77.

So long as the relay R is energized and contacts $R_1$, $R_2$ and $R_3$ are in the "down" position the motor M finds no energizing circuit (provided switch 85 remains open) and remains stationary. Operation of the control switch 70 to a new position breaks the circuit to relay R and normally open contacts $R_1$ as well as contacts $R_2$ and $R_3$ proceed to the open or up position. Thereby a power circuit for the motor M is completed from positive terminals 71, over leads 75, 76, contact $R_2$ through the motor M and thence to contact $R_3$ which is connected to negative terminal 71 over lead 77. The motor, when energized, rotates, driving clockwise, as seen in Figure 1, the selector cam drum assembly 23 through the one way clutch 22, 24 and also the stop ring discs 52 by means of the slip clutch 29, 31, and driving the traveling nut 14, to the left. The latter in turn actuates a switch bar 78 (Figure 5), but slight movement of which serves to close the contacts 79, 80 of an indicator switch 81, and the pairs of contacts 82, 83 and 83, 84 of a stop switch 85.

Closure of the indicator switch 81 energizes an indicator lamp 86 at the control position over a circuit extending from the positive one of terminals 71, lead 75, lead 76, switch 81, and lead 87 to the negative terminal 71. For the indicator lamp 86 may be substituted a relay, if desired, which may perform various control functions. Alternatively the lamp 86 may be paralleled by such a relay. The relay may be utilized, for example, to remove plate voltage from the tubes of a radio equipment, in the event the present invention is utilized for tuning of such equipment, during the tuning operation.

Closure of the stop switch 85 completes a circuit from the normally "hot" lead 76 over contact $R_2$ and switch 85 to a now open contact 88 associated with contact $R_3$.

After the traveling nut 14 has traveled a sufficient distance to assure that the stop ring assembly is zeroized a further switch 74 comprising contacts 89, 90 (known as the zero limit switch) is closed. Since the zeroizing operation may require a complete rotation of the stop ring assembly, the traveling nut is arranged to close switch 74 at a point adequate to enable a complete rotation of shaft 16, of the cam selector drum assembly and of the switch 65. Thereafter when the switch 65 finds the live lead deriving from the switch 70, a circuit is completed from the positive terminal 71, through switch 70, over the live lead of leads 72 and 73, through selector switch 65, zero limit switch 74, to relay R and thence via leads 77 to the negative terminal 71. The relay R being thus energized brings contacts $R_1$, $R_2$, $R_3$ down reversing the potential applied to the motor M, and causing reversal of the direction of its rotation. The selector drum assembly 23 is now at its selected position and the lock ring assembly is zeroized.

Since the selector cam assembly can only be driven clockwise, by virtue of the one way clutch comprising ratchet wheel 22 and pawl 24 the selector cam assembly remains in its selected position and the motor drives only the stop ring drum assembly from its zero position, by means of the friction clutch 29, 31 until the drum is locked by the selected one of the pawls 47, and thereafter continues to be driven until the limit switch 74 is opened. This occurrence does not affect the operation of the motor M, however, since contact $R_1$ is down and provides a circuit for the relay R. As the switch arm 78 re-attains its initial position, however, the indicator switch 81 is opened, de-energizing the indicator lamp or relay 86. The stop switch 85 is also then opened, breaking the circuit to the motor M and stopping the motor. The cycle of operations is now complete.

Reference is now made particularly to Figure 5 of the drawings, wherein is illustrated the structure of a switch bar 78, referred to hereinbefore, and which serves to control various switches involved in the operation of the system. In particular the bar 78 comprises an elongated member fabricated of insulating material, and pivoted on a pin extending through an aperture 96 and driven by a further pin extending downwardly from the traveling nut 14 and into an aperture 91 in the bar 78. Riveted or otherwise secured to the bar 78 are two adjacent parallel flat contact strips 79 and 89, to each of which is soldered a pigtail. Adjacent the central portion of the bar 78 is secured a flat conducting member 83 capable of straddling a pair of stationary elongated spring contacts 82 and 84, the latter being secured to a stationary switch bar 92 fabricated of insulating material. Pigtails are soldered to each of the contacts 82 and 84. The contacts 79 and 89 co-act respectively with elongated spring contacts 80 and 90, secured to the bar 92. The spring contacts 80, 82 and 84 are designed of proper length to assure that but slight movement of the bar 78 toward the bar 92, in response to motion of the traveling nut 14, will result in firm contact being made with the plates 89 and 83 respectively, thus completing circuits which have been heretofore described. The contact 90, on the other hand, is considerably shorter than its adjacent contact 80 and is arranged to contact the plate 89 only after the traveling nut 14 has completed roughly half its maximum travel.

A notch 93 is cut in the switch bar 78, adjacent the aperture 91, which performs the function of engaging a hooked end of a pull bar 94, the other end of the pull bar 94 being secured to a metallic switch member 95 comprising a downwardly depending shoulder 96 in the path of the bar 78 and comprising further a crimp 97 extending into a slot 98, cut into the face of the bar 92. Adjacent to but not in contact with the crimp 97 is a contact bar 99, secured to the bar 92.

The switch member 95 acts in conjunction with the contact bar 99 as a safety switch, which is not normally called upon to play any part in the operation of the system. However, should completion of a selection cycle be prevented for any reason the relay R will not be energized and the motor M will therefore not be caused to reverse at the point where selection should have occurred. The motor M would then continue to drive the selector cam drum assembly, as well as the nut 14, until jamming occurred, in the absence of the safety switch assembly. With the construction and arrangement described, however, when the bar 78 has arrived at a predetermined point in the path of its travel, and which is located so that no jamming can occur, the bar 78 presses against the shoulder 96, and forces the crimp 97 out of the slot 98 and against the contact bar 99, thereby closing the safety switch 100 (Figure 4), and providing a circuit for the relay R directly from the positive lead 75 to the relay R and thence to the negative lead 77. Energization of the relay R causes reversal of the motor M, the stop switch 85 being closed, and the motor returns them toward its starting point. Just prior to reaching the starting point, and with switches 85 and 74 still closed, the notch 93 in switch arm 78 reaches the hook in pull rod 94 and destroys the contact between bar 99 and switch contact 95, reinstating the crimp 97 in the slot or groove 98, which is equivalent to an opening of switch 100 in Figure 4. Opening of switch 100 de-energizes the relay R and thus again reverses the direction of rotation of the motor M and initiates a further selecting operation. The safety switch 100 thus operates to cause a continually repeated cycling action to take place in the system until such time as selection takes place, preventing damage to the mechanism due to temporary prevention of selection.

Prevention of completion of a selection cycle may be caused by modification of the position of the control switch 70 during the selection cycle. If, for example, position number 10 were selected by control switch 70, and the selection cycle permitted to proceed not only until after zeroizing had occurred, but also until the switch 65 had reached a position just precedent to position J, say position H, and if at that time the control switch were moved to position 2, completion of the selection cycle would be prevented since switch 65 would be unable to find a "hot" line 73. It is the function of switch 100 to restart the selection cycle, upon the occurrence of a contingency such as above described, to enable eventual completion of the selection cycle.

*Operation*

Proceeding now to a description of the operation of the system as a whole, any particular switch station at control switch 70 may be made to correspond with any selected shaft position by selecting the particular switch station, and after the pawl 47 corresponding with that switch station has locked its co-acting lock ring 52, releasing the thumb nut 57*a* to permit relative movement of the selected lock ring 52 and the shaft 16. The shaft 16 is then turned to the desired position by manual manipulation of the knob 101, which is secured to the shaft 16 by means of a set screw 102. During this manual manipulation the selected stop disc 52 remains stationary since it is held by an engaging pawl 47. All the other stop discs 52, however, rotate with the shaft and maintain their previously set positions, being separated from the selected stop disc 52 by spacer discs or washers 53 which are keyed to the shaft 16 and which prevent transfer of motion from one stop disc to another. After the shaft 16, or the shaft extension 19, has been rotated to the desired position the stop discs 52 may be locked by turning the thumb nut 57*a* clockwise (Figure 2).

By repetitive operations such as explained in the preceding paragraph each of the switch positions of the switch 70 may be made to correspond with a desired shaft position. The shaft 19 may be connected with or mechanically coupled to control or tuning elements of a radio transmitter or other device, in a manner which is obvious per se, and the control switch 70 then utilized for precise remote control of tuning. Many other operations may obviously be performed which require the precise positioning of one or more shafts, and which will suggest themselves to those skilled in the art.

After the desired shaft positions have been set up any desired one of the pre-established shaft positions may be established automatically by manipulation of the control switch 70. When the operator selects a new position the circuit of the normally energized relay R is broken, starting the motor M in clockwise rotation, and the gear 12 in similar rotation.

The traveling nut 14 moves to the left closing the indicator switch 81 and the stop switch 85 and the clockwise rotation of the gear 12 causes rotation of the selector ring drum assembly 23. As the drum assembly 23 rotates, that one of the pawls 47 which was engaged with a stop ring 52 is cammed out of engagement by the action of the surface 45 against the tail 51. The stop ring assembly and the main shaft 16 are now free to rotate and are caused to do so by the action of the friction disc 31 against the spider 29, the latter slipping until the previously selected stop disc 52 has been released.

As the motor continues to turn the main shaft reaches its zero position, where it is stopped by the action of the projection 61 when it impinges against the stop screw 62, the spider 29 then proceeding to slip. The selector cam drum assembly 23, however, continues to rotate and the switch arm 78 to pivot. Shortly after the main shaft has been zeroized the zero limit switch 74 is closed, which prepares a circuit for the relay R, that circuit being closed when the switch arm of switch 65 finds that one of its contacts which is wired to the selected contact of control switch 70. Energization of relay R operates a series of associated contacts $R_1$, $R_2$, $R_3$ which provides a circuit for the relay R in parallel to the switch 74, and which also serve to reverse the voltage applied to the motor M, causing same to reverse.

During the course of the rotation of the selector cam drum assembly various of the pawl tails 51 have dropped partially into associated recesses 42*a* and have been cammed out again. When selection is complete, at the time of motor reversal, the tail of a particular pawl 47 hereinafter denominated the "selected pawl," has fallen with the recess of the selected cam ring 35, the lug 50 of the selected pawl resting on the outer periphery of the co-acting stop disc 52.

When the motor M reverses and rotates counter-clockwise, the drive gear 12 does likewise, the one way clutch comprising pawl 24 and ratchet 22 being then inoperative. Any tendency to rotate counter-clockwise which may exist for the selector cam drum assembly 23 is restrained by the tail 51 of the selected pawl, which rests against the surface 44 associated with the selected recess 42*a*.

The main shaft 16 and the stop rings 52 are driven by the friction clutch 12, 29, in counter-clockwise rotation until the head or lug 50 of the selected pawl 47 drops within the notch 55 of the associated stop ring 52, in response to the pressure of spring 56, after which the main shaft 16 is locked, the clutch 12, 29 slipping to enable continued rotation of the motor M.

The switch bar 78 has been returning to its starting position during reverse rotation of the motor M, opens the zero limit switch 74, which has no effect on the operation of the system, since the paralleling switch comprising contact $R_1$ is closed. The switch bar 78 continues its return motion, until the stop switch 85 and the indicator switch 81 are opened, when the motor M becomes deenergized and the operation is completed.

Should completion of selection be prevented by reason of a displacement of the control switch 70 in the course of a shaft positioning operation but prior to completion of the operation, the switch arm 78 will continue to the limit of its travel, where it will encounter and close the safety switch 100, causing reversal of motor M. That such failure may take place due to no defect of the mechanism will become apparent when it is considered that the control switch 70 may be operated to select new shaft positions at any time, and that one or more control operations may conceivably take place in the course of a cycle of operations of the mechanism. When the motor, in reversed direction, approaches its initial position, but before it becomes de-energized, the safety switch 100 is opened by the action of pull bar 94, and the system embarks upon another selection cycle.

Should it be desired to position the shaft 16 manually, the control switch 70 is turned to position 11, which corresponds with a point 46 on the inner periphery of the selector cam drum assembly which contains no recess 42*a*. Thereby, all the pawls 47 are retained out of engagement with the stop discs 52, and the shaft 16 remains free except for such friction as may be introduced by the friction clutch 12, 29. Rotation of knob then enables corresponding free rotation of the shaft 16 within the limits set by the limit stop mechanism 60 (Figure 6).

Having described one specific embodiment of the invention, it is to be understood that modifications of various constructional features, as well as of the arrangement and combination of various of the elements of the system, may be resorted to without departing from the spirit and true scope of the invention, which is defined in the appended claims.

What I claim and desire to secure by Letters Patent of the United States of America is:

1. Shaft positioning apparatus comprising a shaft positionable to any one of a plurality of predeterminable positions, a selector cam drum assembly, a plurality of stop discs each positionably secured to said shaft, a plurality of pawls selectable one by one by said selector cam drum assembly and each operable when selected to lock one of said stop discs only, said shaft and said pawls being at least in part located interiorly of said selector cam drum, a multi-contact selector switch having a finder arm secured to said selector cam drum, a multi-contact selective control switch having contacts connected one for one with contacts of said selector switch, a drive system for rotating said selector cam drum, a unidirectional clutch means coupling said drive system to said selector cam drum, means responsive to a predetermined operation of said control switch for initiating a cycle of operation of said drive system in a direction to accomplish rotation of said selector cam drum by said unidirectional clutch, means for terminating operation of said drive means when said finder contact reaches a contact of said selector switch which is connected to a selected contact of said control switch, and means operative only upon failure of said finder contact to reach a contact of said selector switch which is connected to a selected contact of said control switch for initiating a repetition of said cycle of operation, said last means responsive to attainment by said selector cam drum of a limit position during the first mentioned cycle of operation.

2. Shaft position apparatus comprising a shaft positionable to any one of a plurality of predetermined positions, a selector cam drum assembly, a plurality of stop discs positionably secured to said shaft, a plurality of pawls selectable one by one by said selector cam drum assembly and each operable when selected to lock one of said stop discs only, said shaft being at least in part located interiorly of said selector cam drum, a control switch, means for initiating a positioning operation of said selector cam drum in response to control action of said control switch, and means responsive to failure of said positioning operation for initiating a further positioning operation.

3. Shaft positioning apparatus comprising a multi-contact selector switch having a finder contact, a multi-contact control switch having contacts connected one for one with the contacts of said multi-contact selector switch, a selector cam drum, a drive system for driving said selector cam drum, unidirectional clutch means coupling said drive system to said selector cam drum, means responsive to operation of said control switch to select a predetermined contact of said control switch for initiating operation of said drive system in a direction to accomplish movement of said selector cam drum via said unidirectional clutch means, a safety switch operable in response to attainment of an unsafe position by said selector cam drum means for terminating operation of said drive system in said a direction when said finder contact reaches a contact of said selector switch selected by said control switch or said safety switch operates, a shaft, a plurality of discs releasably secured to said shaft, a lock notch formed in each of said discs, means for locking said discs to said shaft, said selector cam drum having drum cam recesses accessible interiorly thereof and at least in part surrounding said discs, and a plurality of pawls each having a head portion for securing a lock notch of one only of said discs and a tail portion spring pressed to drop into one only of said recesses, and means operative following said termination of operation of said drive system in said a direction for rotating said shaft toward a position determined by the position of said selector cam drum.

4. Shaft positioning apparatus comprising a shaft positionable to any of a plurality of predeterminable positions, a rotatable selector cam drum assembly, a plurality of stop discs positionably secured to said shaft, a plurality of pawls selectable one by one by said selector cam drum assembly for different rotative positions thereof and each operable when selected to lock one of said stop discs only, said shaft being at least in part located interiorly of said selector cam drum, a multi-contact selector switch, having a finder arm secured to said selector cam drum, a multi-contact selective control switch having contacts connected one for one with contacts of said selector switch arm, a drive system for rotating said selector cam drum, a unidirectional clutch means coupling said drive system to said selector cam drum, means responsive to a predetermined operation of said control switch for initiating operation of said drive system in a direction to accomplish rotation of said selector cam drum by said unidirectional clutch, a safety switch operated in response to predetermined rotation of said selector cam drum, and means for terminating operation of said drive system in said a direction when said finder contact reaches a contact of selector switch which is connected to a selected contact of said control switch, or when said safety switch operates and for initiating a further operation of said drive system reversely to said a direction.

5. Shaft positioning apparatus comprising a shaft positionable in any one of a plurality of predeterminable positions, a hollow rotatable selector cam drum encompassing said shaft, a plurality of stop discs positionably secured to said shaft, a plurality of pawls selectable one by one by said selector cam drum in response to increments of rotation thereof, each of said pawls associated with one of said stop discs, and operable when selected to lock one of said stop discs only in a predetermined position, a multi-contact selector switch having a plurality of contacts and a contact finder arm, means for selectively applying potential to said contacts, first drive means for rotating said selector cam drum and comprising a unidirectional clutch, said unidirectional clutch comprising a ratchet wheel and pawl, reversible drive means for rotating said shaft comprising a slipping bi-directional clutch, means responsive to potential applied to a selected one of said contacts for actuating said first drive means for rotating said selector cam drum to a selected position determined by the selected contact, thereby to select one of said pawls, and for actuating said reversible drive means for rotating said shaft to a predetermined zero position, means operative only after said shaft has been rotated to said zero position and said selector cam drum to said selected position for reversing both said drive means, whereby said unidirectional clutch is decoupled and said shaft is rotated reversely via said slipping clutch, and means responsive to arrival of said shaft to a position predetermined by selection of said pawl, while rotating reversely, for locking said shaft against further motion while said slipping clutch continues to slip.

6. Shaft positioning apparatus, comprising, a shaft positionable to any one of a plurality of predeterminable positions, a selector cam drum assembly, a plurality of stop discs positionably secured to said shaft, a plurality of pawls selectable one by one by said selector cam drum assembly and each operable when selected to lock one of said stop discs only, a multi-contact selector switch having a switch position determined by the position of said selector cam drum, a control switch for selecting contacts of said multi-contact selector switch, a reversible drive motor, a unidirectional clutch coupling said drive motor and said selector cam drum assembly, a bi-directional slipping clutch for coupling said motor and said shaft, means responsive to selection of a predetermined contact of said multi-contact selector switch by said control switch for initiating rotation of said motor in a direction to drive said unidirectional clutch and thereby said selector cam drum assembly in a first predetermined direction and to drive said shaft via said bi-directional slipping clutch in said first predetermined direction toward a zeroized position, a safety limit switch operable in response to attainment by said selector cam drum assembly of a predetermined unsafe position, and means responsive to attainment of said selector cam drum assembly of either said unsafe position or a position corresponding with said predetermined contact of said multi-contact selector switch for effecting reversal of said motor.

7. A shaft positioning system comprising a plurality of pawls, a shaft positionable to any one of a plurality of predeterminable positions, a pawl selector for selecting one of said pawls, stop discs secured to said shaft, each of said pawls selecting a different one of said stop discs when selected by said pawl selector, means for zeroizing said shaft in one direction and thereafter cycling said pawl selector in said one direction to select a predetermined pawl, means thereafter actuating said stop discs in a reverse direction to engage said predetermined pawl, and means responsive to failure of said pawl selector to select said predetermined pawl for recycling said pawl selector to select a predetermined pawl.

WILLIAM L. WORTHEN.

REFERENCES CITED

The following references are of record in the file of this patent:

UNITED STATES PATENTS

| Number | Name | Date |
|---|---|---|
| 1,257,198 | Duncan | Feb. 19, 1918 |
| 2,164,309 | Collins | July 4, 1939 |
| 2,216,272 | Kaye | Oct. 1, 1940 |
| 2,293,355 | Olson | Aug. 18, 1942 |
| 2,320,808 | Van Lammeren et al. | Jan. 1, 1943 |
| 2,378,941 | May | June 26, 1945 |
| 2,391,470 | May | Dec. 25, 1945 |
| 2,553,951 | Stamper | May 22, 1951 |
| 2,574,603 | Uhlig | Nov. 13, 1951 |

FOREIGN PATENTS

| Number | Country | Date |
|---|---|---|
| 385,672 | Great Britain | Jan. 5, 1933 |